Jan. 31, 1956 M. VLOCH 2,733,354
X-RAY FILM PACKET HOLDER WITH POSITION INDICATING MEANS
Filed Aug. 6, 1952

INVENTOR.
CHARLES F. TEICHMANN
BY
*J. K. Grahame*
ATTORNEY

United States Patent Office 2,733,354
Patented Jan. 31, 1956

2,733,354

X-RAY FILM PACKET HOLDER WITH POSITION INDICATING MEANS

Mark Vloch, Bronx, N. Y.

Application August 6, 1952, Serial No. 302,884

5 Claims. (Cl. 250—67)

This invention relates to an X-ray film packet holder adapted to be held by the teeth for disposing the film packet in position in the mouth to produce an X-ray picture of the teeth.

Film packet holders of this character include a sheath having pairs of score lines on which it is folded to dispose the film packet in various positions with reference to a bite tab connected with the sheath and which tab is adapted to be gripped between the teeth for holding the sheath in position in the mouth. Frequently, the sheath is improperly adjusted which is not determined until emposure and which indicia is visible through an opening or placed in the mouth with the result that the holder must be removed and the film packet withdrawn so as to readjust the holder for taking the X-ray picture desired. In order to avoid the possibility of improperly adjusting the holder, the present invention has for an object to provide a film packet holder of said character which is provided with means for indicating the several adjustments or settings of the holder and the position of the film packet when the holder is inserted in the mouth.

Another object of the invention is to provide a holder having indicia for indicating the setting thereof for apical upper, interproximal, and apical lower radiographic exposure and which indicia is visible through an opening or window in the forward wall thereof prior to the insertion of the film packet therein.

Another object of the invention is to provide a film packet holder having radiopaque indicia which is so located that the indicia will appear on the exposed film packet to indicate the particular position taken of the teeth.

With the foregoing and other objects in view, reference is now made to the following specification and accompanying drawings in which the preferred embodiment of the invention is illustrated:

In the drawings:

Fig. 4 is a perspective view of the holder adjusted for taking an apical upper radiograph of the teeth.

Fig. 5 is a view of the blank from which the holder is formed and showing the indicia applied thereto.

Figure 1:
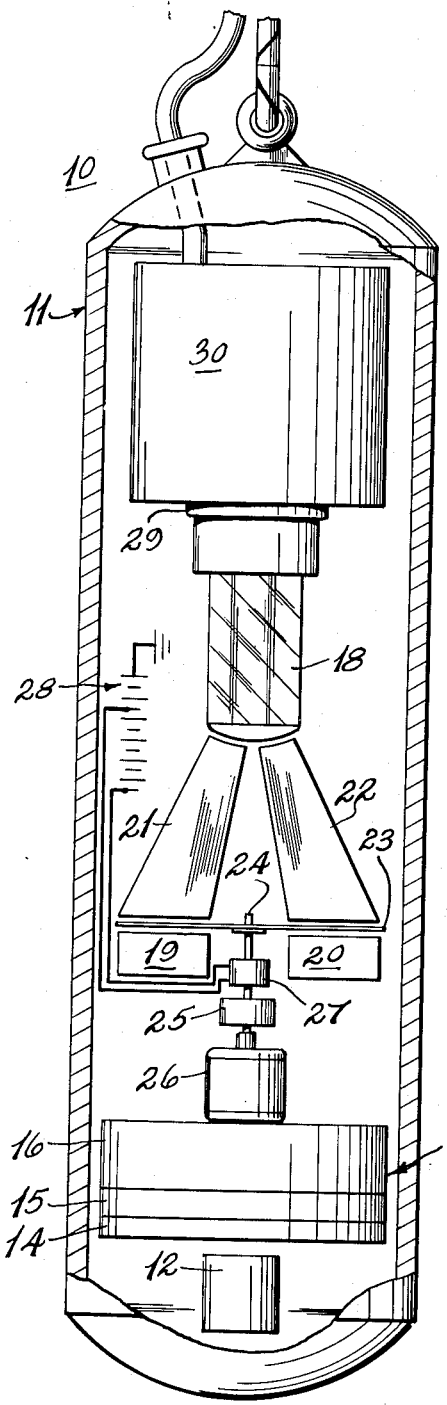
Fig. 1 is a diagrammatic view of a holder constructed in accordance with the invention with an X-ray film packet arranged therein and illustrating the manner in which the same is held in position in the mouth.
Figure 2:
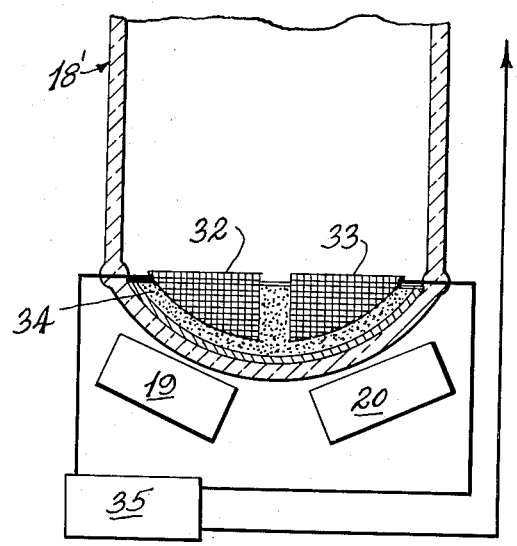
Fig. 2 is a perspective view of the holder arranged for supporting the film packet therein for obtaining an interproximal radiograph of the teeth.
Figure 3:
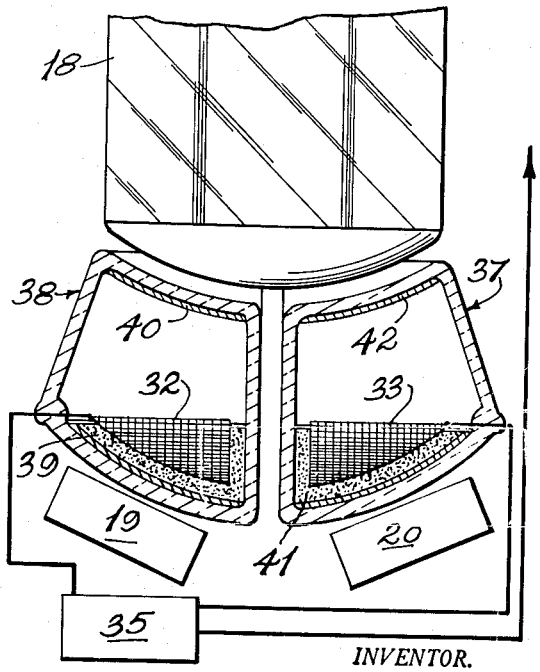
Fig. 3 is a perspective view of the holder adjusted for taking an apical lower radiograph of the teeth.

Referring to the drawings by characters of reference, the holder is fashioned from a strip of sheet material 10 such as paper, cellophane, and the like, which is folded or looped and secured together in sheath formation by adhesively securing the end portion 11 to the inner face of the strip adjacent the end portion 12. The end portion 12 is foldable on the fold line 13 into right angular relation with the sheath to form a bite tab adapted to be engaged between the teeth for retaining the holder in position in the mouth.

The sheath is provided with three pairs of fold lines 14 and 15, 16 and 17, and 18 and 19 for disposing the sheath in various positions with reference to the tab for obtaining apical upper, interproximal and apical lower X-ray pictures or radiographs of the teeth. The sheath is of a size to slidably receive an X-ray film packet from either end and to retain the same in fixed position therein. As illustrated, the sheath may be adjusted to dispose the tab 12 substantially medially between the fold lines 14 and 15 for taking an interproximal radiograph of the teeth. The sheath may also be folded on the fold lines 16 and 17 to dispose the tab 12 substantially midway between the fold line 16 and the transverse medial of the holder for taking apical lower X-ray pictures or radiographs of the teeth, or the sheath may be folded on the fold lines 18 and 19 to dispose the tab 12 substantially half way between the longitudinal medial line of the sheath and the fold line 19 for taking apical upper X-ray pictures or radiographs of the teeth.

In order to readily indicate the setting of the holder for taking the desired X-ray picture or radiograph of the teeth, the holder is provided with indicia on the inner face of the rear wall such as apical upper, interproximal and apical lower as illustrated by the reference character 20, which are visible before the insertion of the film packet through the window 21 which may be transparent or an opening and which is located in the forward wall of the sheath above the bite tab 12 and substantially midway between the opposite ends of the sheath. Thus the sheath may be adjusted on the various pairs of fold lines so that the indicia corresponding to the setting desired is visible through the window 21, whereupon the X-ray packet may be inserted in the sheath and the holder is in condition for use.

The aforesaid indicia indicated by the reference character 20 are radiolucent markings so that the same will not be exposed on the film packet. In order to clearly indicate on the X-ray film picture or radiograph the particular setting taken, the holder is provided with indicia on the forward wall thereof such as the words "Film Position" disposed at one side of the window 21 and an arrow indicated by the reference character 22 on the opposite side thereof, which indicia consist of radiopaque markings which will be exposed on the X-ray film but which will not be in a position on the X-ray picture or radiograph to interfere with the reading of the picture.

The strip of sheet material 10 from which the sheath is produced may be made of opaque paper, wax paper, cellophane and the like and when made of opaque paper the window 21 in the forward wall thereof may be produced by providing a rectangular opening therein, or by providing an area which is rendered transparent by suitably impregnating the same with wax or oil or which window may consist of a cellophane section secured to and overlying an opening in the forward wall. The sheath may also be fashioned entirely from a transparent strip of material as shown in Fig. 6 of the drawings. In this form of the invention the indicia representing the three radiographs of the teeth, namely apical upper, interproximal and apical lower are visible respectively through the forward wall thereof above the tab 12 when the sheath is folded for taking radiographs corresponding thereto. The indicia "Film Position" and the arrow also appear on the forward wall of this form of sheath which are disposed in horizontal alignment with the visible indicia and the indicia "Film Position" and arrow being radiopaque will be exposed on the X-ray film.

While the preferred embodiment of the invention has been shown and described, it is to be understood that the invention is not so limited and the same covers and in-

What is claimed is:

1. A holder for an X-ray film packet including an open ended sheath for receiving the packet therein and having a tab adapted to be gripped between the teeth for retaining the holder in position in the mouth, said sheath having three pairs of fold lines for folding the sheath to dispose the tab at three different positions with reference to the edges of the packet for taking radiographs of three positions of the teeth, said sheath having indicia arranged at different positions on the inner face of the sheath indicating said radiographs respectively, and said sheath having an area in the front wall thereof above said tab through which said indicia are visible respectively when the sheath is folded for taking radiographs corresponding thereto.

2. A holder for an X-ray film packet including an open ended sheath for receiving the packet therein and having a tab adapted to be gripped between the teeth for retaining the holder in position in the mouth, said sheath having three pairs of fold lines for folding the sheath to dispose the tab at three different positions with reference to the edges of the packet for taking apical upper, interproximal and apical lower radiographs of the teeth, said sheath having indicia arranged at different positions on the inner face of the sheath indicating said radiographs respectively, and said sheath having an area in the front wall thereof above said tab through which said indicia are visible respectively when the sheath is folded for taking radiographs corresponding thereto.

3. A holder for an X-ray film packet including an open ended sheath for receiving the packet therein and having a tab adapted to be gripped between the teeth for retaining the holder in position in the mouth, said sheath having a plurality of pairs of fold lines for folding the sheath to dispose the tab at different positions with reference to the edges of the packet for taking radiographs of a plurality of positions of the teeth, said sheath having an opening in the forward wall thereof adjacent said tab and indicia indicating said positions respectively arranged on the inner face of the sheath and visible through said opening for aiding the folding of the sheath for obtaining said positions respectively.

4. A holder for an X-ray film packet including an open ended sheath for receiving the packet therein and having a tab adapted to be gripped between the teeth for retaining the holder in position in the mouth, said sheath having a plurality of pairs of fold lines for folding the sheath to dispose the tab at different positions with reference to the edges of the packet for taking radiographs of a plurality of positions of the teeth, said sheath having an opening in the forward wall thereof and indicia indicating said positions respectively arranged on the inner face of the sheath and visible through said opening for aiding the folding of the sheath for obtaining said positions respectively, and said sheath having radiopaque indicia on the outer face of the forward wall thereof adjacent said opening, said indicia being adapted to appear as markings on the radiographs for indicating thereon the respective position taken of the teeth.

5. A holder for an X-ray film packet including an open ended sheath for receiving the packet therein and having a tab adapted to be gripped between the teeth for retaining the holder in position in the mouth, said sheath having three pairs of fold lines for folding the sheath to dispose the tab at three different positions with reference to the edges of the packet for taking apical upper, interproximal and apical lower radiographs of the teeth, said sheath having indicia arranged at different positions on the inner face of the sheath indicating said radiographs respectively, and said sheath having an area in the front wall thereof above said tab through which said indicia are visible respectively when the sheath is folded for taking radiographs corresponding thereto, and said sheath having radiopaque indicia on the outer face of the forward wall thereof adjacent said area, said last mentioned indicia being adapted to appear as markings on the radiographs for indicating thereon the respective position taken of the teeth.

References Cited in the file of this patent

UNITED STATES PATENTS

| | | |
|---|---|---|
| 1,467,876 | Raper | Sept. 11, 1923 |
| 1,687,068 | Hodgson | Oct. 9, 1928 |
| 1,824,794 | Rohlfes | Sept. 29, 1931 |
| 1,974,936 | Vloch | Sept. 25, 1934 |
| 2,075,491 | Wilson | Mar. 30, 1937 |
| 2,433,480 | Rendich | Dec. 30, 1947 |